J. H. MAYDOLE.
Stone-Gatherer.

No. 19,430. Patented Feb. 23. 1858.

UNITED STATES PATENT OFFICE.

JAMES H. MAYDOLE, OF EATON, NEW YORK.

IMPROVEMENT IN MACHINES FOR GATHERING STONES.

Specification forming part of Letters Patent No. 19,130, dated February 23, 1858.

*To all whom it may concern:*

Be it known that I, JAMES H. MAYDOLE, of Eaton, in the county of Madison and State of New York, have invented certain Improvements in Machines for Gathering Stones and Pulverizing Earth, the construction and operation of which I have described in the following specification and illustrated in the accompanying drawings with sufficient clearness to enable competent and skillful workmen in the arts to which it pertains or is most nearly allied to make and use my invention.

My said invention consists in, first, so constructing the scoops and so arranging them in reference to and in combination with the other parts that they will strike the earth and stones directly endwise in passing over the apron, and as they rise be turned or rotated, as described, to retain the stones; second, so constructing the fingers in the scoops that they will cover the fingers in the apron instead of the spaces between them, as described, by which they are made more efficient in their action, as hereinafter more fully set forth; third, the combined adjustment of the carriage and of the scoops upon it, by which the apron may be maintained at different angles at the same height or at the same angle and different heights from the ground, or both, varied at pleasure, as hereinafter more fully set forth.

Figure 1:
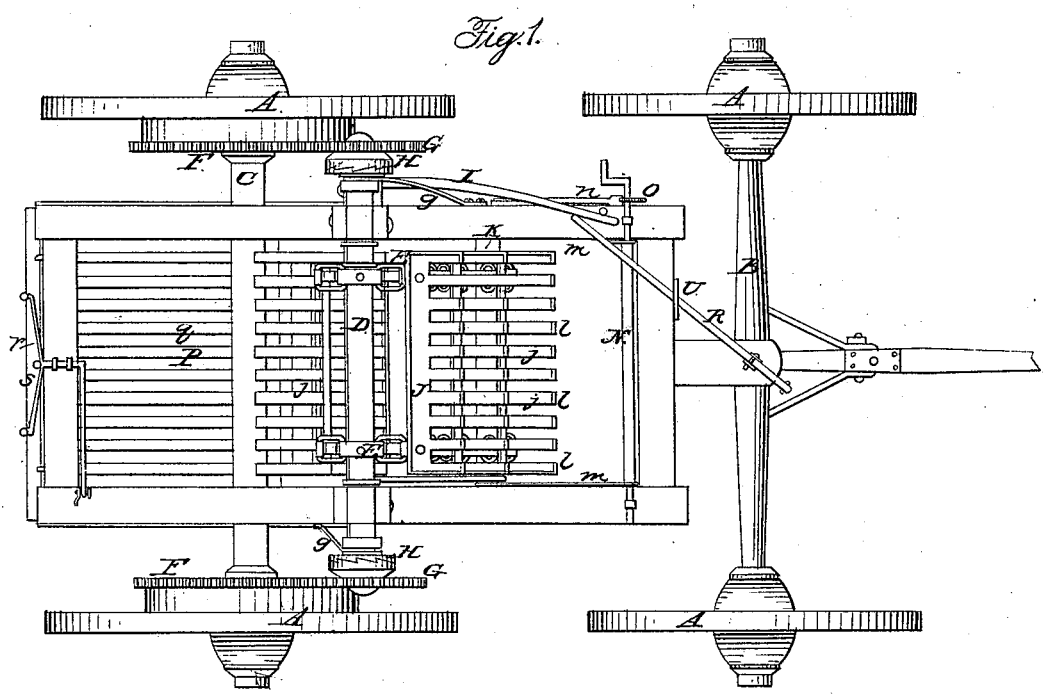
Figure 2:
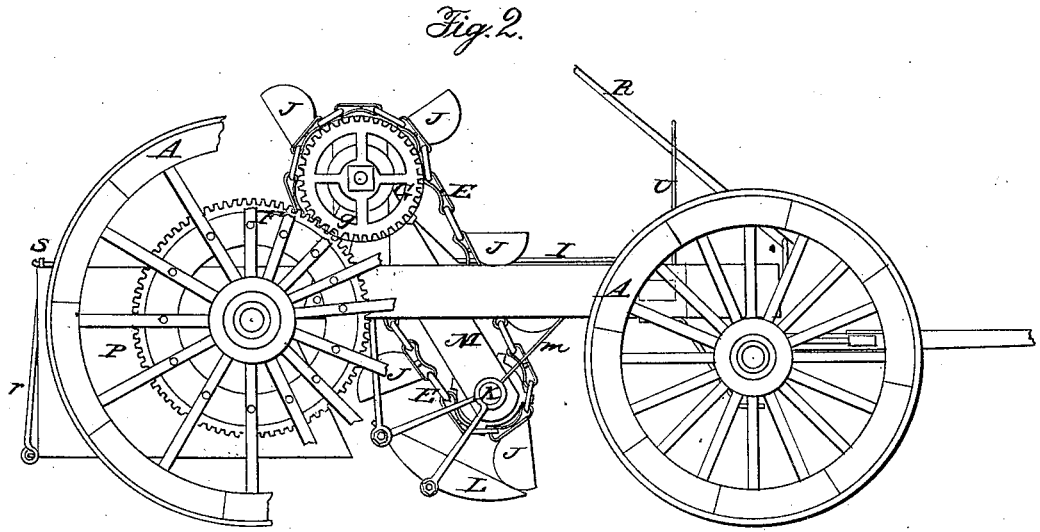

In the accompanying drawings, Figure 1 is a plan of my machine. Fig. 2 is a side elevation of it, one of the wheels being partially broken away to give a clear view of other parts.

A A are the wheels. B is the front axle. C is the back axle. D is the shaft upon which the scoop-chains E are hung, and from which they receive motion. This shaft D receives its motion from the hind wheels of the machine by means of the spur-wheels F, which are attached to the said hind wheels, and gear into the spur-wheels G, which are fitted loosely upon the shaft E, to which they are connected by the clutch-couplings H H. These couplings are controlled by the lever I to throw them out of gear; but are thrown into gear by the springs J J when the pressure of the lever to throw them out of gear is removed. This lever I acts upon the springs, and not otherwise directly upon the clutches, and by a connecting-rod placed under the shaft D is made to operate the spring, and consequently the clutch on the opposite side as well as the one against which it directly bears. By this arrangement both of the hind wheels (upon which the weight is principally placed) are very easily so connected to the shaft D as to impart to it their tractive force to propel the scoops.

J are the scoops, made in the curved form shown in the drawings, and so arranged in connection with the lower scoop-shaft, K, and the apron L as to present as they advance over the apron their ends directly to the stones or other substances which may be upon said apron, but still so arranged and connected as to so turn around the shaft K as to receive and secure the stones within their concavity in such a manner as to insure their retention before the scoops have arisen sufficiently far to allow them to escape. To prevent clogging and consequent suspension of the actions of the parts or their destruction by breakage, the scoops are made to move against the dirt in the direction of the advance of the machine, as previously intimated, and as will be seen by examining the connections of the gearing to the traction-wheels, and partly for this purpose and partly for securing a more efficient action in other respects the fingers $j$ of the scoops are made to cover the fingers $l$ of the apron L instead of the spaces between them. This arrangement causes the fingers $j$ to push the loose dirt from the fingers $l$, and insures a more efficient action of the scoops in gathering the stones from the apron.

The frame M, upon which the apron is hung and which supports the shaft K, is hung concentric with the upper shaft, D, and may be vibrated so as to raise or lower the apron and scoops without deranging the connection or action of any of the parts, thereby allowing the machine to be adjusted to any depth required by operating the windlass N, to which the frame M is connected by cords $m$. This windlass is secured in position by the pawl $n$ working into the ratchet-wheel $o$.

The adjustment above described, though giving the necessary elevation and depression, might not always secure the angle at which it might be desirable that the apron and scoops should meet the earth upon which it is to operate. To secure this further adjustment an adjustment of the forward end of the frame upon which the scoop-shaft and apron are hung is so combined with the device previously described for changing the position of these parts that a change of the elevation of the apron and scoops may be had without changing their angular position to the earth by raising or lowering the forward end of the frame, and thereby raising or lowering the shaft D by which their angular position may be changed, as above stated. This adjustment is made by connecting the lever R at the end to the forward end of the main frame of the machine, and bringing it over the top of the king-bolt $t$, which serves it as a fulcrum, and from which it extends back over the ratcheted guide U, by the teeth of which it may be secured in the desired position.

The stones are carried up by the scoops over the shaft D and emptied into the box P, the bottom of which, formed of the slats $q$, may be let down by disconnecting the braces $r$ from the lever-catch $s$, which allows the bottom of the box to fall, and also allows the end board which forms the back of the box to be turned up out of the way.

The particular improvements which constitute my said invention, and which I claim as having been originally and first invented by me, are—

1. So constructing the scoops and so arranging them in reference to and in combination with the other parts that they will strike the earth and stones directly endwise in passing over the apron, and as they rise be turned or rotated to retain the stones, as described.

2. So constructing the fingers of the scoops and so arranging them in connection with those of the apron that they shall cover the fingers of the apron instead of the spaces between them, as set forth.

3. The combined adjustment of the carriage and of the scoops upon it, described, by which the apron and scoops may be maintained at different angles at the same height or at the same angle at different heights from or in the ground, or both, at pleasure, as set forth.

JAMES H. MAYDOLE.

Witnesses:
J. W. ARMSTRONG,
C. W. BURRITT.